UNITED STATES PATENT OFFICE.

BERNARD EDWARD BUSE, OF ST. LOUIS, MISSOURI.

COSMETIC WASH.

SPECIFICATION forming part of Letters Patent No. 277,221, dated May 8, 1883.

Application filed March 6, 1883. (No specimens.)

*To all whom it may concern:*

Be it known that I, BERNARD EDWARD BUSE, a citizen of the United States, residing at St. Louis and State of Missouri, have invented a new and useful Composition of Matter to be used for a Complexion and Healing Wash, of which the following is a specification.

My composition consists of the following ingredients combined in the proportions stated, viz: water, one-half gallon; water of ammonia, two drams; powdered borax, one dram; rose-water, four ounces; essence of bergamot, one dram; sulphate of zinc, one dram; fluid aniline, or aniline dissolved in a suitable solvent, one-half dram. These ingredients are to be mixed and let stand for two days.

By using the above-named composition it will beautify the complexion and remedy some skin-diseases. Apply the wash to the skin with a little sponge twice a day. For the face use about one table-spoonful each time.

Some of the ingredients may have been used before; but I am not aware that all of the ingredients of my composition in the proportions stated have been used together.

What I claim, and desire to secure by Letters Patent of the United States, is—

The herein-described composition of matter to be used for a complexion and healing wash, consisting of water, water of ammonia, powdered borax, rose-water, essence of bergamot, sulphate of zinc, and aniline, in the proportions specified.

BEN. ED. BUSE.

Witnesses:
JOHN C. H. STEVENS,
HANNIBAL LAEVY.